US010621279B2

(12) United States Patent
Dua et al.

(10) Patent No.: US 10,621,279 B2
(45) Date of Patent: Apr. 14, 2020

(54) CONVERSION QUALITY EVALUATION FOR DIGITIZED FORMS

(71) Applicant: ADOBE INC., San Jose, CA (US)

(72) Inventors: Varun Dua, Bangalore (IN); Vikas Patidar, Noida (IN); Saswata Dutta, Bangalore (IN); Deepak Kumar, Noida (IN)

(73) Assignee: Adobe Inc., San Jose, CA (US)

( * ) Notice: Subject to any disclaimer, the term of this patent is extended or adjusted under 35 U.S.C. 154(b) by 228 days.

(21) Appl. No.: 15/822,466

(22) Filed: Nov. 27, 2017

(65) Prior Publication Data

US 2019/0163733 A1  May 30, 2019

(51) Int. Cl.
*G06F 17/00* (2019.01)
*G06F 17/24* (2006.01)
*G06F 17/21* (2006.01)
*G06K 9/00* (2006.01)
*G06K 9/72* (2006.01)
*G06N 7/00* (2006.01)

(52) U.S. Cl.
CPC .......... *G06F 17/243* (2013.01); *G06F 17/212* (2013.01); *G06K 9/00469* (2013.01); *G06K 9/72* (2013.01); *G06N 7/005* (2013.01)

(58) Field of Classification Search
None
See application file for complete search history.

(56) References Cited

U.S. PATENT DOCUMENTS

| 8,812,946 | B1* | 8/2014 | Kopylov | G06F 17/2247 715/202 |
|---|---|---|---|---|
| 2003/0012460 | A1* | 1/2003 | Zlotnick | G06K 9/033 382/311 |
| 2003/0231344 | A1* | 12/2003 | Fast | G06K 9/033 358/1.18 |
| 2007/0180148 | A1* | 8/2007 | Yadidian | G06F 17/212 709/246 |
| 2008/0002234 | A1* | 1/2008 | Corso | H04N 1/00355 358/405 |
| 2009/0073501 | A1* | 3/2009 | Gutarin | G06K 9/00456 358/403 |
| 2009/0148075 | A1* | 6/2009 | Driscoll | G09B 7/02 382/321 |
| 2011/0078554 | A1* | 3/2011 | Nie | G06F 17/278 715/234 |
| 2012/0072859 | A1* | 3/2012 | Wang | G06K 9/00442 715/764 |
| 2013/0223721 | A1* | 8/2013 | Nepomniachtchi | G06K 9/00536 382/138 |

(Continued)

*Primary Examiner* — Mustafa A Amin
(74) *Attorney, Agent, or Firm* — Shook, Hardy & Bacon L.L.P.

(57) ABSTRACT

The conversion quality evaluation system may evaluate the conversion quality of digital forms digitized from paper forms. The system may attribute multiple labels and respective confidence scores to form objects in a form, and aggregate information of form objects to form a conversion index, which is a measurement of conversion quality of the form. The conversion index may comprise various characteristics of the form, including cost of correction, accessibility, content reusability, or device readiness. As such, the conversion quality evaluation system can sort digital forms based on their conversion quality and provide guidance for post-digitization activities.

20 Claims, 6 Drawing Sheets

(56) References Cited

U.S. PATENT DOCUMENTS

| | | | |
|---|---|---|---|
| 2013/0322757 A1* | 12/2013 | Pan | G06K 9/18 382/182 |
| 2014/0010452 A1* | 1/2014 | Wyle | G06K 9/726 382/182 |
| 2014/0223277 A1* | 8/2014 | Kimber | G06F 17/243 715/223 |
| 2015/0030307 A1* | 1/2015 | Williams, Jr. | G06K 9/00442 386/224 |
| 2015/0281739 A1* | 10/2015 | Russell | G06K 9/52 382/182 |
| 2016/0203625 A1* | 7/2016 | Khan | G06T 11/60 345/636 |
| 2018/0011974 A1* | 1/2018 | Schneider | G06F 16/5846 |
| 2018/0025222 A1* | 1/2018 | Yellapragada | G06K 9/00442 382/176 |
| 2018/0189592 A1* | 7/2018 | Annis | G06K 9/344 |
| 2019/0026579 A1* | 1/2019 | Hall | G06K 9/033 |

\* cited by examiner

CONVERSION QUALITY EVALUATION FOR DIGITIZED FORMS

BACKGROUND

Digitization is the process of converting information into a digital format for data processing, storage, and/or transmission. Because digital formats offer a number of advantages over paper documents, various entities, including government agencies, schools, businesses, and individuals, have converted information into a digital format. By way of example, government agencies typically have large quantities of offline paper forms that are used to collect data from their citizens or customers related to public services. These paper forms may be scanned into digital forms for data collection, storage, or archive. The digitized forms may also be used to automate their related workflows and processes.

Oftentimes, to ensure a quality conversion of a form, authors or reviewers of a form conversion manually compare the digitized forms with the original form design. In the event any errors are detected by the reviewer, the reviewer can fix the errors incurred during the digitization process. Such a manual review process can be time intensive and error-prone, particularly when numerous form conversions are assessed.

SUMMARY

Embodiments of the present disclosure relate to systems and methods for evaluating conversion quality. As such, embodiments of the present disclosure relate to various conversion quality measurements, e.g., a conversion index to measure the conversion quality. As described in embodiments herein, technical solutions are provided to automatically enable the workflow of generating conversion quality measurements. The conversion index is a unified measurement that represents various aspects of the conversion quality of a digitized form, including cost of correction, user accessibility, content reusability, or device readiness. As such, the conversion index may be used to sort forms based on their conversion quality and provide guidance for post-digitization activities, such as review or corrections.

In one embodiment, the system starts with identifying labels and associated respective confidence scores to form objects on a form. Based on the various labels and their respective confidence scores, the system determines various conversion quality measures of form objects. Subsequently, the system aggregates one or more conversion quality measurements of all form objects into a unified measurement to represent the overall conversion quality of the form.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

Embodiments will be readily understood by the following detailed description in conjunction with the accompanying drawings.

DETAILED DESCRIPTION

Paper forms are oftentimes converted into a digital format, for example, to process and/or store data. Traditionally, upon converting paper forms into digital format, form authors or reviewers typically compare the digitized forms with the original form design to ensure quality conversions and to fix any errors incurred during the digitization process. This post-conversion review and correction process is usually labor-intensive and error-prone.

Typically, the post-conversion review process involves a multi-step workflow. By way of example only, a reviewer might review the correctness of converted form objects, correct labels that have been wrongly assigned to form objects, checks the responsiveness of corrected forms, check that accessibility settings are correctly specified on each relevant form object, checks if any of the converted form objects, such as form section or text paragraph, map to the existing reusable sections or text content that are already curated and managed by the system, check if the digitization process has created objects that were not in the paper form, and conduct many other miscellaneous tasks.

When considering the review process at a scale of thousands of paper forms being digitized via batch processing, the manual review process quickly requires an immense amount of time and becomes unmanageable. There is a need to effectively prioritize the review process based on the conversion quality of digitized forms, and direct reviewers' attention to form objects with erroneous labels.

In this disclosure, technical solutions are provided to evaluate conversion quality of digitized forms. To this end, embodiments of the present disclosure include a conversion quality evaluation system and related processes for evaluating conversion quality of digitized forms based on various conversion quality measurements. Assessing conversion quality of digitized forms can enable effective prioritization of the review process based on the identified conversion quality of the digitized forms thereby reducing time needed to review form conversions. Further, assessing form quality conversion can direct the reviewer's attention to form objects associated with erroneous labels resulting in a more efficient and effective review process.

At a high level, and as described in reference to illustrative embodiments, a conversion index is developed to represent an overall conversion quality of a digitized form. The conversion index can represent various aspects of the conversion quality of a digitized form, including cost of correction, user accessibility, content reusability, device readiness, etc. The conversion index, or conversion quality, can then facilitate a review of the digitized form, for example, by indicating forms for which a more thorough review should be performed, indicating form objects for which a more thorough review should be performed, and/or the like.

In one implementation, labels and associated respective confidence scores are identified for form objects on a form. Based on the various labels and their respective confidence scores, the system determines various conversion quality measurements of form objects, such as the cost of correction measurement. Subsequently, these conversion quality measurements of all form objects can be aggregated into a form conversion index to represent the overall conversion quality of the form.

The form conversion index (FCI) may be used to prioritize and accelerate the review process. In one embodiment, a high value associated with the FCI indicates that the form was converted with high accuracy and may need minimal corrections. A low score associated with the FCI indicates a low quality conversion thereby recommending the form be carefully reviewed with potential more required corrections.

Further, within a form, the conversion quality of an object can be similarly represented by an object conversion index (OCI). The OCI enables a reviewer to quickly locate what needs to be fixed in the form. In one embodiment, OCI values of objects in a form are sorted into different buckets, and objects in different buckets may be highlighted in different colors, e.g., in RED, YELLOW, and GREEN, to provide reviewers visual cues.

In summary, the disclosed technical solutions provide various advantages. The conversion index may be used to sort forms based on their conversion quality and provide guidance for the post-digitization review process. By way of example, a reviewer may identify those production-ready forms with high FCI scores among bulk converted forms. Forms with FCI scores greater than a threshold value may be published without further review. On the other hand, low FCI scores may invite more attention from reviewers for potential correction. Further, individual objects inside a form may be highlighted based on their conversion quality to guide reviewers to locate whereabouts of those objects needing correction. In some embodiments, FCI and OCI are also used to define tentative cost of correction, including time or number of steps required for correction. In some embodiments, suggestions for correction, e.g., alternative labels for form objects, are also provided to facilitate reviewers to make quick corrections.

Various terms are used throughout this description. Definitions of some terms are included below to provide a clearer understanding of the ideas disclosed herein.

The term "form" or "digitized form" refers to a collection of data resulting from a digitization process, which is suitable for further processing. Digitization is the process of converting information into a digital format for data processing, storage, and/or transmission. Forms, as referred to herein, include any forms used for data collection or exchange. Various forms are used for various purposes (e.g., business purposes), for example, one form may be used by a job seeker to input personal information, while another form may be used by an insurance applicant to input health information.

The term "object" or "form object" refers to a collection of form data that share a common attribute. A form may contain many different types of objects, such as Header, Footer, Text, Field, Choice List, Table, Figure, Embedded Object, etc. A form may contain different objects as different levels of constructs. In other words, an object may contain one or more sub-objects. By way of example, a table object may contain a cell object, a text object, a figure object, or even another table object.

The term "label" refers to the class label assigned to a form object, e.g., by a multi-label classification engine, which can assign multiple labels to a form object. Each label represents a category or a class that the form object may be associated with. For multi-label classification, any number of labels can be assigned to a form object. By way of example, multiple labels, such as Header, Footer, Text, Field, Table, or Figure, may be assigned to a form object.

The term "confidence" or "confidence score" refers to a probability score associated with a label, e.g., assigned by a multi-label classification engine. A confidence score represents a likelihood that a form object belongs to a particular class. A high confidence score can generally indicate that the predication of the associated label is more accurate. When multiple labels are assigned to a form object, one of the labels will be selected as the representative label for the form object. In various embodiments, the label with the highest confidence score is selected as the representative label. The confidence score of an object, as used herein, refers to the confidence score of the representative label.

Figure 1:
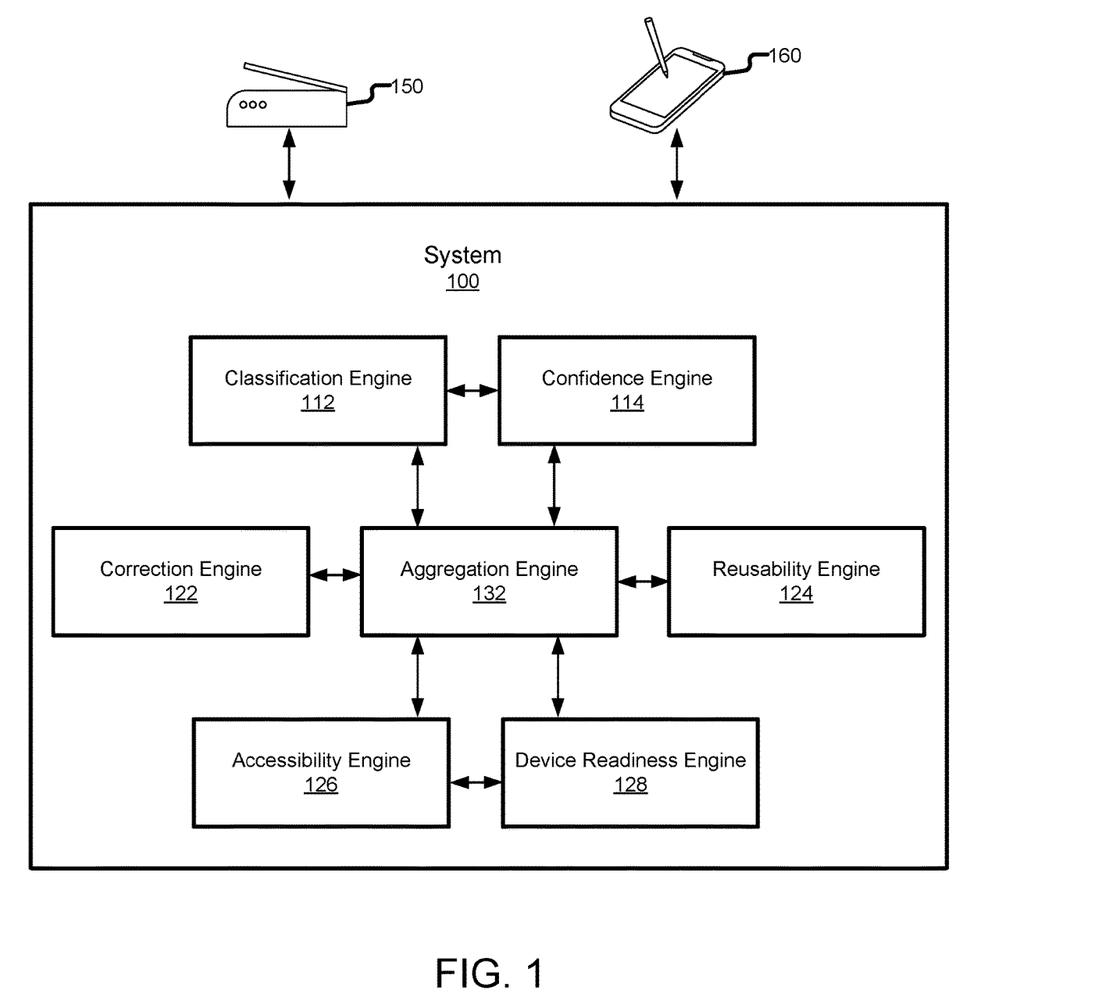
FIG. 1 is a schematic diagram illustrating an example implementation of a conversion quality evaluation system, incorporating aspects of the present disclosure, in accordance with one embodiment.

Referring now to FIG. 1, a schematic diagram illustrates an example implementation of a conversion quality evaluation system. In accordance with various embodiments, system 100 receives a digitized form, for example, from input device 150, assesses the conversion quality of the form, and provides an indication of the conversion quality to the review device 160 to enables a reviewer to effectively review the form. As illustrated in FIG. 1, conversion quality evaluation system 100 includes classification engine 112, confidence engine 114, correction engine 122, reusability engine 124, accessibility engine 126, device readiness engine 128, and aggregation engine 132, operatively coupled with each other.

In some embodiments, system 100 is a server computing device and/or service, such as a server and/or a service provided in a computing cloud, and interacts with various digitization devices and user devices. In alternative embodiments, system 100 can be integrated with a user computing device, such as input device 150 or review device 160, or any other type of user device.

In some embodiments, system 100 is embodied as a specialized computing device. In some embodiments, system 100 can be embodied, for example, as an application, a mobile application, or an online computing service. In some embodiments, system 100 can be a distributed system, for example, each of classification engine 112, confidence engine 114, correction engine 122, reusability engine 124, accessibility engine 126, device readiness engine 128, and aggregation engine 132 can be distributed across any number of servers. Regardless of the computing platform on which system 100 is implemented, system 100 can be embodied as a hardware component, a software component, or any combination thereof for evaluating conversion quality of digitized forms.

In some embodiments, input device 150 may include a scanner or a camera. In some embodiments, input to system 100 are images, PDF files, or other print version of forms, which are uploaded into system via an application programming interface (API) or user interface, e.g., via review device 160. Review device 160 may be a computer, a mobile device, or a wearable device that is capable of displaying a form to a user and enabling the user to upload, interact, review, or edit the form.

Returning to the system 100, classification engine 112 generally assigns one or more labels to objects within forms. In embodiments, the classification engine 112 includes a multi-label classifier to assign one or more labels to each of detected object in a form. In such an embodiment, instead of categorizing an object as precisely one of many object types, classification engine 112 can assign any number of object types to an object. In some cases, system 100 may have a master object type list for different types of objects, like Title, Sub-Title, Date, Time, Text, Image, Field, Choice List, Table, Header, Footer, etc. Each of these object types may have sub-types. As an example, the sub-types of Field could be of date, comb box, currency field, simple textbox, multi-line textbox, etc. Likewise, Text may have subtypes of different levels of headings, table caption, field labels, instruction text, etc. In such cases, the classification engine 112 may access the master object type list, which may include sub-types, and identify an appropriate label(s) for an object.

To identify or predict a label(s) for an object, the classification engine 112 may transform the multi-label problem into a set of binary classification problems, which can then to be solved using single-class classifiers. Alternatively, classification engine 112 may predict a label(s) for an object using algorithm adaptation methods by adapting some classification algorithms or models, such as boosting, k-nearest neighbors algorithms, decision trees, neural networks, etc. When neural networks are used, classification engine 112 may adapt back-propagation algorithms for multi-label learning to assign multi-labels to a form object.

Confidence engine 114 is generally configured to determine or provide confidence scores for labels assigned to objects. In particular, when multiple labels are assigned to a form object, classification engine 112 can determine a confidence score for each label assigned to the object. The confidence engine 114 can utilize confidence scores associated with multiple labels assigned to an object to rank the labels.

Further, the confidence engine 114 may determine or select a particular label, from among candidate labels, to be assigned to an object. In a simple case, confidence engine 114 may choose the label with the highest confidence score as the representative label for the object. However, if the object contains sub-objects, the confidence score of the object may be impacted by the confidence scores of those sub-objects, which will be further discussed in connection with FIG. 2.

Correction engine 122 is generally configured to determine the cost to correct inaccurate predictions made by classification engine 112. As described, the classification engine 112 assigns labels to objects based on probabilistic predications. In some embodiments, the label with the highest confidence score is deemed as the representative label for the form object. Correction engine 122 can then assign a number to each form object that represents a cost for correcting inaccurate predictions by, e.g., a reviewer. The process to determine the cost of correction can be performed in any number of ways, some of which are discussed in connection with FIG. 3.

Reusability engine 124 generally assesses the reusability of form objects. Typically, in enterprise systems, enterprise customers have many pre-curated or reviewed form content, like text paragraphs, images, etc. There are also some pre-configured field objects, like a date of birth field. A section in a form includes a collection of fields. Sometimes, a whole section in a form may be pre-configured, such as medical history sections. In some embodiments, reusability engine 124 maps forms objects to existing reusable content using semantic mapping or other text/image matching algorithms. If a mapping is found, reusability engine 124 may further determine a reusability score for the object, which is further discussed in connection with FIG. 3. A high level of reusability of form objects generally means a high level of conversion quality.

Accessibility engine 126 generally assesses the accessibility of form objects or forms. Accessibility is important for forms to be useful online. It is generally desirable to design a web form in a way so that it remains generally accessible such that users with accessibility challenges do not face difficulty in viewing or filling the form. There are multiple factors that can make a form accessible. For instance, a field having a caption associated with it can enable visually impaired users to understand and fill a form using text-to-speech utilities. There are various accessibility standards for Hypertext Markup Language (HTML) forms published by W3C. In some embodiments, accessibility engine 126 acts as a generic accessibility checker based on one or more accessibility standards. Further, accessibility engine 126 may emphasize those accessibility issues specifically related to the digitization process of paper forms, such as fields with missing captions. Assessing accessibility can be performed in any number of ways, some of which are further discussed in connection with FIG. 3.

Device readiness engine 128 generally assesses whether the form is coherent, e.g., without discontinuities, when displayed on heterogeneous devices. In some embodiments, the digitized form will be transformed into HTML pages. Although the device readiness can be checked after the final HTML is generated, there are several factors that facilitate HTML generation. Device readiness engine 128 can identify such factors and assign a device readiness score (DRS) to a form or an individual object based on those factors, such as the number of incomplete paragraphs, the number of fields without captions, the size of sections, etc. One example process to compute DRS is further discussed in connection with FIG. 3.

Aggregation engine 132 is generally configured to form a conversion quality measurement, such as an object conversion index (OCI) for a form object or a form conversion index (FCI) for a form, by aggregating individual assessments from classification engine 112, confidence engine 114, correction engine 122, reusability engine 124, accessibility engine 126, and device readiness engine 128. As can be appreciated, in some cases, not all the individual measurements from these evaluation engines mentioned above will be utilized. By way of example, some use cases may request high accessibility while other use cases may prioritize low cost of correction. System 100 allows users to assign priority to each engine by specifying respective weights to different engines. Accordingly, aggregation engine 132 can aggregate different scores from respective engines based on the user's priority or the weights assigned to respective engines. The process of generating OCI or FCI is further discussed in connection with FIG. 3.

In other embodiments, conversion quality evaluation system 100 can be implemented differently than that depicted in FIG. 1. As an example, classification engine 112 can be combined with confidence engine 114 to form a comprehensive engine to assign labels and respective confidence scores to form objects. In some embodiments, components depicted in FIG. 1 have a direct or indirect connection not shown in FIG. 1. In this way, the components depicted in FIG. 1 can be connected in any number of ways and are not limited to the connections illustrated in FIG. 1. In some embodiments, some of the components depicted in FIG. 1 are divided into multiple components. Further, one or more components of conversion quality evaluation system 100 can be located across any number of different devices and/or networks. As an example, accessibility engine 126 or device readiness engine 128 can be implemented as an independent component in a computing cloud.

Figure 2:
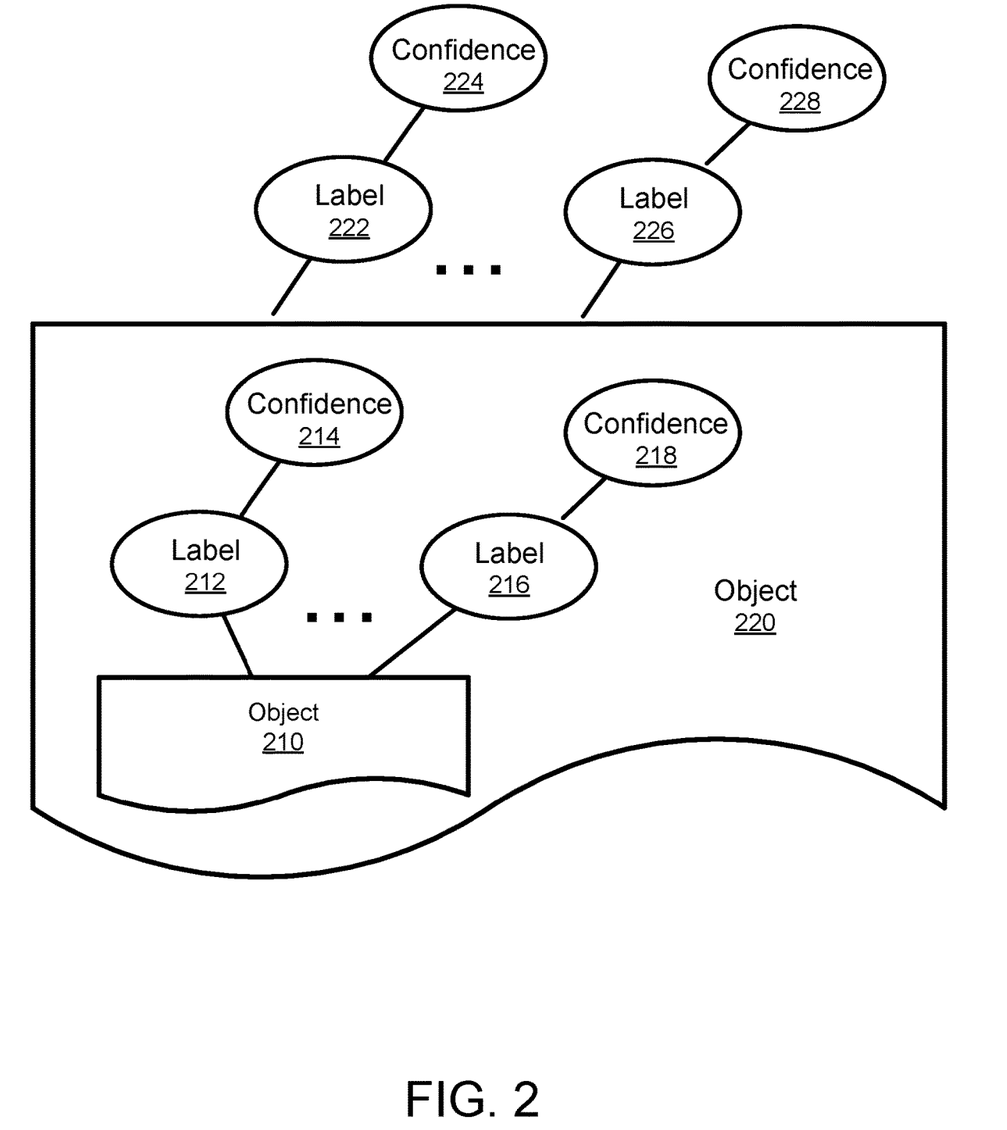
FIG. 2 is a schematic diagram illustrating form objects, incorporating aspects of the present disclosure, in accordance with one embodiment.

FIG. 2 is a schematic diagram illustrating object 210 and object 220, in accordance with an embodiment of the present disclosure. Object 220 is a high level construct that contains object 210. By way of example, object 210 may be a simple form construct, such as a text line, widget, field, etc., while object 220 may be a high level form construct, such as a table, a section, a form, etc. High level form constructs generally refer to objects that contain at least another object. Confidence engine 114 of FIG. 1 may use the confidence scores of associated low level form objects to compute the confidence score of a high level form object.

In one embodiment, the final confidence score of form object 220 is computed based on the predicted confidence scores of object 220 (e.g., confidence 224 of label 222 and confidence 228 of label 226) and the confidence scores of associated objects (e.g., confidence 214 of label 212 and confidence 218 of label 216). By way of example, assume object 220 is a table object, and object 210 is a cell associated with the table among many other cells. Initially, confidence engine 114 may use the predicted highest confidence score for the object, e.g., confidence 214 of label 212 for object 210. Similarly, confidence engine 114 may use confidence 224 of label 222 for object 220. However, since object 220 is a table that contains object 210 and other cells, the final confidence score of object 220 is impacted by the confidence scores of object 210 and other cells. As such, confidence engine 114 can average the confidence scores of individual cells, including object 210, and attributes the averaged confidence score of all cells to object 220. To this end, the final confidence score of object 220 can be a result of weighted average between confidence 224 and the averaged confidence score of all cells contained in the table. In other embodiments, other methods may be used to combine the confidence score of object 220 and the confidence scores of its associated objects, such as assigning respective weights to all related objects, and taking a weighted average of these objects.

Another aspect of computing the confidence score of a high level form object is to penalize for incorrect object recognitions at the digitization process. Confidence engine 114 may identify different types of inaccurate object recognitions, such as non-existing or incompatible objects, or incorrect object associations.

A hallucinated object is an object which may not exist in the form but has been erroneously inserted into a form. In those situations, confidence engine 114 identifies these potentially incorrectly inserted objects and penalizes the confidence score of such object accordingly. Confidence engine 114 may identify a hallucinated object based on some deviation from the typical characteristics associated with a class of object. For example, a text line without text content or a table without a table cell may be a hallucinated object. Penalization may be accomplished by applying a predetermined discount factor to the confidence score. Penalization may also be accomplished by applying a dynamically determined discount factor based on the number of hallucinated objects, such as increasing the discount factor for increased number of hallucinated objects.

Incorrect associations among objects is problematic. Oversized or undersized association refer to when a high level form construct is associated with objects that are not contained in it (oversized association) or fails to cover all the objects that it contains (undersized association). To detect oversized or undersized associations, confidence engine 114 computes an intersection score (e.g., Jaccard similarity coefficient) of two high level objects in some embodiments. A high intersection score denotes an oversized or undersized association issue, and confidence engine 114 may apply a predetermined discount factor to the confidence score or dynamically determine the discount factor based on the intersection score, such as relating the discount factor with the intersection score. In some embodiments, the bounding boxes of two objects are used to detect oversized or undersized associations. By way of example, a form object that has been labelled as a table is considered oversized if its bounding box overlaps with some other objects that are not table cell objects. Similarly, a form object is considered undersized if one of its children is partially located outside its bounding box, for instance, when a section contains only half of a paragraph.

Figure 3:
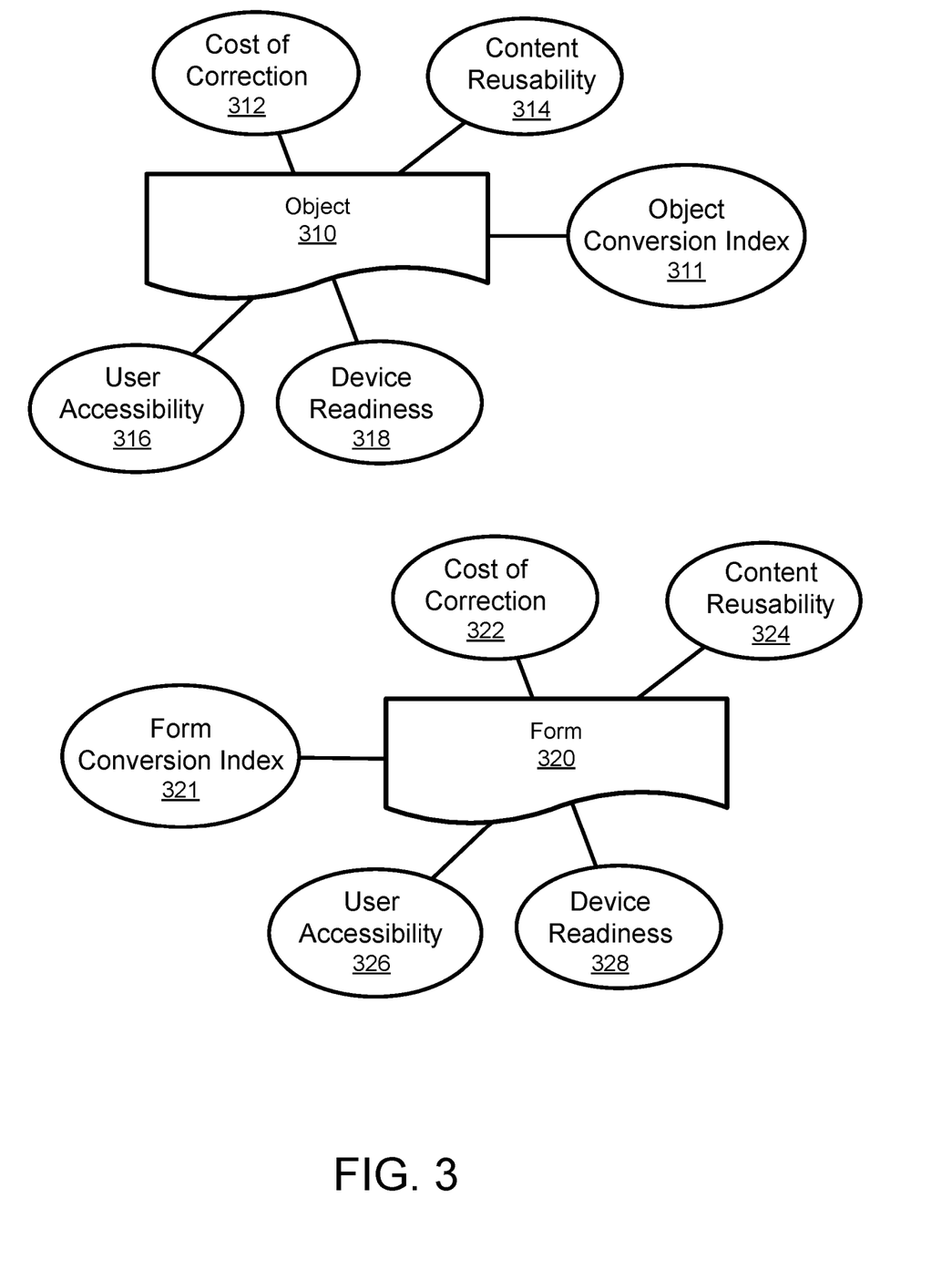
FIG. 3 is a schematic diagram illustrating measurements of a form object or a form, incorporating aspects of the present disclosure, in accordance with one embodiment.

FIG. 3 is a schematic diagram illustrating conversion quality measurements of object 310 and form 320, in accordance with an embodiment of the present disclosure. FIG. 3 is generally discussed in combination with FIG. 1 to convey various aspects of the present disclosure. As previously described, a conversion quality evaluation system can determine conversion indices, such as object conversion indices and form conversion indices. Such conversion indices represent an overall conversion quality of a digitized form. The conversion index can represent various aspects of the conversion quality of a digitized form, including cost of correction, user accessibility, content reusability, device readiness, etc. As shown in FIG. 3, object conversion index (OCI) 311 is generated for object 310. OCI 311 can be determined based on information of cost of correction 312, content reusability 314, user accessibility 316, or device readiness 318. Similarly, as shown in FIG. 3, a form conversion index (FCI) 321 is generated for form 320. FCI 321 can be determined based on information of cost of correction 322, content reusability 324, user accessibility 326, or device readiness 328.

As discussed in connection with FIG. 1, to generate such conversion indices, classification engine 112 can assign multiple labels to an object within a form and associate a confidence score with each predicted label. In some embodiments, confidence engine 114 then selects the label with the highest confidence score as the representative label for the object. As such predictions are probabilistic, there is a probability that the object should be corrected from the predicted type to its true type. In one embodiment, to calculate the cost of correction (i.e., CC(k)) for a form object k, e.g., cost of correction 312 for object 310 or cost of correction 322 for form 320, correction engine 122 can utilize equation 1 below, where P is the set of all predictions or labels for an object with k as the final prediction. Confidence(p) denotes the confidence score associated with the particular label p. Further, correction engine 122 can use a N by N conversion operation metric M, where N is the number of types of form objects or labels in the system. M[i][j] signifies the number of operations to convert an object i to object j. For example, converting a date field to text field would be a single operation, while changing a field to a choice list would require multiple operations.

$$CC(k) = \frac{\sum_{p \in P} \text{Confidence}(p) * M[k][p]}{\sum_{p \in P} M[k][p]} \quad \text{(eq. 1)}$$

In general, correction engine 122 can utilize equation (1) or other method to evaluate the overall cost for correcting an object based on the confidence level and the number of operations for correction associated with each label assigned to the object.

The cost of correction for a form (e.g., cost of correction 322) can be evaluated based on the cost of correction of each object contained in the form, e.g., by averaging the cost of correction for individual form objects with a suitable averaging method. In one embodiment, different weights may be assigned to different labels to compute the cost of correction for a form. In this way, labels with particular importance may be emphasized to evaluate the cost of correction of a form.

Reusability engine 124 is to assess the reusability of form objects, and generate scores for content reusability 314 for object 310 or content reusability 324 for form 320. A high level of reusability of form objects or a form generally means a high level of conversion quality. Typically, enterprise document systems have a lot of pre-curated content, like text paragraphs or images. If an object matches with any existing content from repository, such as form fragments, reusable paragraphs, reusable field, the matched object would get a high reusability score since the content of those reusable objects has been reviewed and corrected already. Resultantly, the reviewer could save time for post-conversion review and corrections.

Reusability engine 124 may use equation (2) or other method to determine a content reusability (CR) score to represent another aspect of conversion quality. For equation (2), sim(f,k) is a similarity measure between a form object f and k, which may be defined in equation (3). The similarity measure may be based on a matching of features of two objects or forms. If the percentage of matching features is greater than a predetermined threshold, the two objects or forms would be considered as a match, although other methods can be used to identify a match $$CR(k) = sim(k, f) * OCI(f) * \text{Confidence}(k) \quad \text{(eq. 2)}$$

$$sim(f, k) = \begin{cases} 1, & \text{if } k == f \\ 0, & \text{otherwise} \end{cases} \quad \text{(eq. 3)}$$

Using equation (2), reusability engine 124 can compute a content reusability score for each form object, such as content reusability score 314 for object 310. If the form object finds a matching object in the repository, then its content reusability score is the product of its predicted confidence score and the OCI of the matching form object in the repository. Content reusability score 324 for form 320 may be similarly evaluated at the form level or aggregated based on content reusability scores of individual objects contained in the form. Further, if a form object or form is already reviewed, its OCI or FCI may be deemed as a perfect score.

In this way, reusability engine 124 may compute reusability scores based on confidence scores as well as the overall percentage of objects that have been matched to the existing content. The higher the content reusability, the lesser effort required to review and correct the form since matched source content would have already gone through the review process.

Accessibility engine 126 is to assess the accessibility of form objects or forms, and generate scores for user accessibility 316 for object 310 or user accessibility 326 for form 320. In some embodiments, accessibility engine 126 acts as a generic accessibility checker based on one or more accessibility standards. Further, accessibility engine 126 may emphasize those accessibility issues specifically related to the digitization process of paper forms, such as fields with missing captions.

In one embodiment, accessibility engine 126 computes accessibility scores based on a ratio between the form objects that have strong likelihood of being accessible and the number of total form objects. Different form objects have different criteria for being accessible. If a form object satisfies the accessible criteria defined for the label assigned to the object, then there is a high probability for the object being accessible. For example, a field having a caption might have a high probability of being accessible since most tools to assist visually impaired persons would read aloud the caption of a field, thus making it accessible to visually impaired persons. Similarly, for other types of form objects, the specific criteria might be different, such as preference that a choice list should have a title, a section should have a heading, and so forth.

Device readiness engine 128 is to assess whether the form is coherent, e.g., without discontinuities, when displayed on heterogeneous devices. Device readiness engine 128 is to generate scores for device readiness 318 for object 310 or device readiness 328 for form 320. In some embodiments, device readiness score is evaluated based on the number of incomplete paragraphs, the number of objects without necessary companions, the size of sections, etc.

Regarding incomplete paragraphs, there are chances that a paragraph may be broken into multiple incomplete paragraphs or lines during the digitization process. Once that happens, the paragraph has potential to abruptly end in the middle of a line, especially for devices with small screens. Device readiness engine 128 may use a natural language grammar checker to detect the proper sentence and paragraph boundaries. In one embodiment, device readiness engine 128 assigns device readiness score of 1 if a paragraph passes the grammar checker, otherwise 0. Device readiness engine 128 may tally the count of incomplete paragraphs for computing the device readiness of a form.

Regarding objects without necessary companions, for example, a field without a caption, there is a high probability that the content of such objects may get lost when the content reflows across multiple devices. The same is true for sections without heading or choice lists without title. Device readiness engine 128 may keep a count of objects without necessary companions.

Regarding large sections, if a section is large in terms of number of objects inside that section, the section may become difficult to reflow on a small screen device. As a result, users may have to scroll over the large section and may lose focus. Sometime, it is necessary to break a large section into smaller sections. Device readiness engine 128 may have a predetermined optimal section size for different devices, and track the count of sections that exceed the threshold.

In one embodiment, device readiness engine 128 uses equation (4) to compute a single measurement for device readiness. The device readiness score (DRS) can be computed based on multiple factors as described above. In equation (4), bPara is the count for broken or incomplete paragraphs, and tPara is the total paragraph count in the form. bField is the broken or caption-less field count, and tField is the total field count. bSection is the count for large sections, and tSection is the total section count.

$$DRS(F) = 1 - \frac{(bPara + bField + bSections)}{tPara + tField + tSection} \quad \text{(eq. 4)}$$

As can be appreciated, cost of correction 312, content reusability 314, user accessibility 316, or device readiness 318 might be differentiated, or weighted differently, for different user cases to compute OCI 311 for object 310. Similarly, cost of correction 322, content reusability 324, user accessibility 326, or device readiness 328 may be differentiated, or weighted differently, for different user cases to compute FCI 321 for form 320. For example, some user cases may want high accessibility score while some may require low cost of correction. In this regard, aggregation engine 132 can enable users to assign priority, e.g., weight, to different aspects of conversion quality measurements, so that aggregation engine 132 can compute OCI 311 or FCI 321 based on the specific priority in different user cases.

In some embodiments, OCI 311 or FCI 321 is a number between 0 and 1, which is to indicate the overall conversion quality of the object or the form. Considering $W_{cc}$, $W_{cr}$, $W_{ua}$, $W_{dr}$ being the weights assigned to the aspects of cost of correction, content reusability, user accessibility, and device readiness respectively, e.g., based on the business requirements in a user case, OCI(k) for an object k may be computed based on equation (5), while FCI(k) for a form k may be computed based on equation (6).

$$OCI(k) = \frac{W_{cc} \times (1 - CC(k)) + W_{ua} \times UA(k) + W_{cr} \times CR(k) + W_{dr} \times DR(k)}{W_{cc} + W_{ua} + W_{cr} + W_{dr}} \quad \text{(eq. 5)}$$

$$FCI(f) = \frac{W_{cc} \times (1 - CC(f)) + W_{as} \times AS(f) + W_{cr} \times CR(f) + W_{dr} \times DR(f)}{W_{ccp} + W_{as} + W_{cr} + W_{dr}} \quad \text{(eq. 6)}$$

Although described above as a numeric value between 0 and 1, as can be configured the conversion quality can be represented using any type of value, e.g., any numerical value, text values, symbols, etc. In various embodiments, form reviewers use FCI as a guideline to prioritize their review workflow and even estimate their workload. For example, a high FCI indicates a high level of production readiness, which means that the reviewer may expect to spend less time to review the form. On the contrary, a low FCI indicates a low conversion quality, which means that the reviewer should expect to spend more time to review this form and correct potential errors. Similarly, OCI scores of objects in a form can help reviewers to quickly focus on questionable objects that needs review and correction. In this way, both FCI and OCI may help reviewers to improve their productivity.

Figure 4:
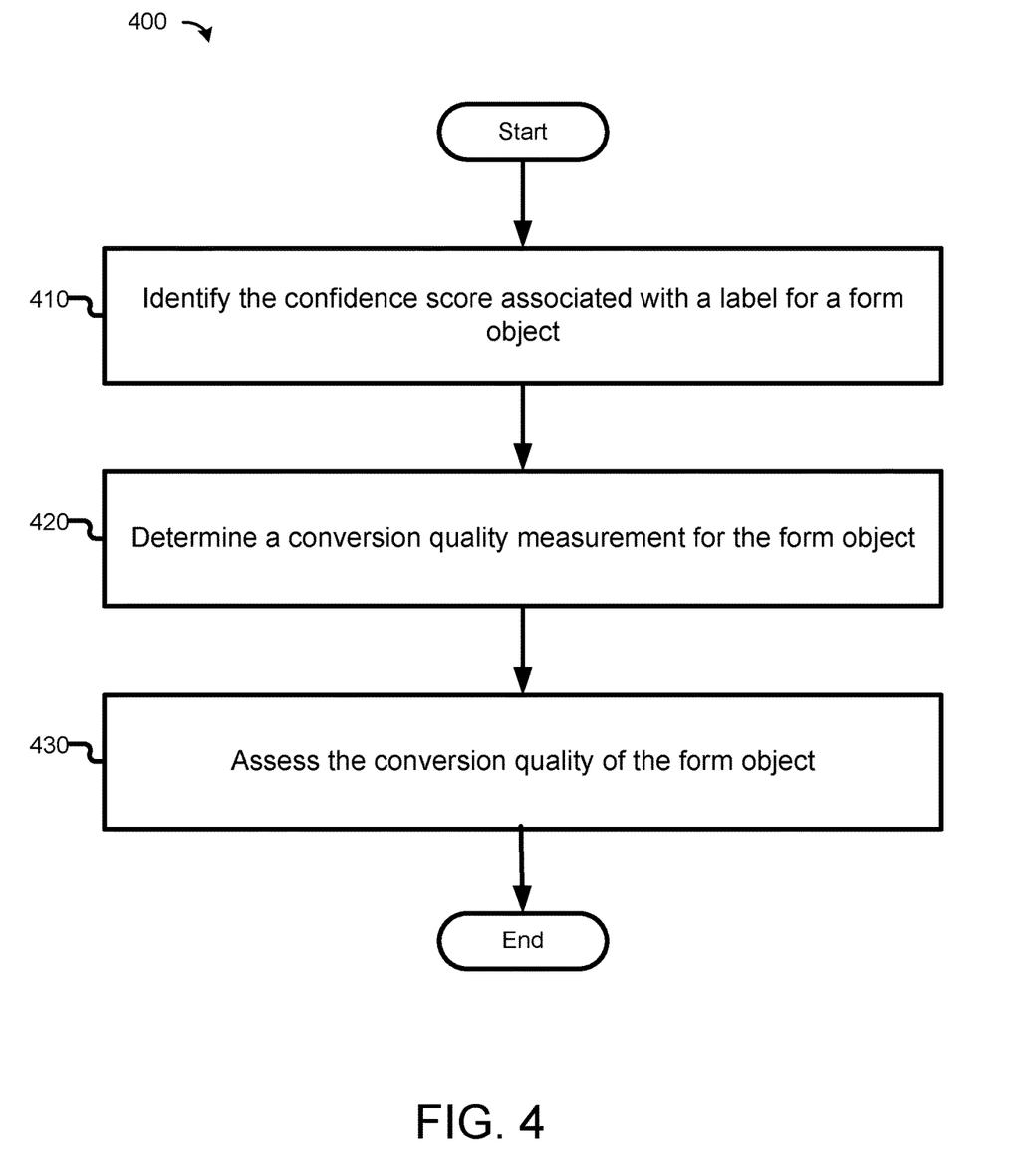
FIG. 4 is a flow diagram of an example process for assessing conversion quality of a form object, incorporating aspects of the present disclosure, in accordance with one embodiment.

FIG. 4 is a flow diagram of an example process for measuring conversion quality of a form object, incorporating aspects of the present disclosure. Process 400 can be performed, for example, by a conversion quality evaluation system. Process 400 can be performed by processing logic that comprises hardware (e.g., circuitry, dedicated logic, programmable logic, microcode, etc.), software (e.g., instructions run on a processing device to perform hardware simulation), or a combination thereof. The processing logic can be configured to evaluate one or more aspects of conversion quality of a form object in a digitized form.

It will be appreciated that process 400 is not limited to measure isolated aspects of conversion quality measurements. Rather, process 400 can generate a conversion quality measurement for the overall conversion quality of an object. It will also be appreciated that, in various embodiments, process 400 can have fewer or additional operations than those depicted, or perform some of the depicted operations in a different order without departing from the scope of this disclosure.

In various embodiments, the process begins at block 410, where the confidence score associated with a label for a form object is identified, e.g., enabled by confidence engine 114 assisted by classification engine 112 of FIG. 1. The digitization process is to transform an original form, e.g., a paper form, to a digitized form. A multi-label classifier can assign one or more labels with respective confidence scores to each of detected object in the digitized form. A confidence score is a prediction of the likelihood of association between the form object and a respective label assigned to the object. In some embodiments, a label with the highest confidence score is selected as the representative label to be attached to the form object. If the object is a high level construct than includes a sub-object, the final confidence score may be affected by the confidence score of the sub-object as discussed in connection with FIG. 2.

At block 420, a set of conversion quality measurements for the form object is determined, e.g., by correction engine 122, reusability engine 124, accessibility engine 126, or device readiness engine 128 of FIG. 1. The cost of correction score may be determined based on confidence scores of respective labels assigned to the object as discussed in connection with FIG. 3. The process may involve multiple operations, such as retrieving conversion information of the number of operations required to convert a form object to another form object based on their labels; identifying a final prediction label of the form object; and calculating weighted average operations for correcting each of labels assigned to the object to the representative label of the object.

Similarly, other aspects of conversion quality may be determined for the form object, such as the reusability score, the accessibility score, the device readiness score, etc. The reusability score may depend on a match between the object being evaluated and another object that has already been reviewed or otherwise verified. The accessibility score can be evaluated based on whether the object is accessible according to the specific accessibility criteria defined for the particular type of object. The accessibility score may be determined based on a probability of the form object of being accessible and an accessibility threshold probability.

Next, at block 430, the overall conversion quality of the form object is to be assessed, e.g., by aggregation engine 132 of FIG. 1. In some embodiments, an object conversion index is determined to represent the overall conversion quality of a form object. The object conversion index is determined based on the set of conversion quality measurements, such as cost of correction for the form object, the content reusability score for the form object, the accessibility score for the form object, or the device readiness score, as discussed in connection with FIG. 3.

It will be appreciated that the weights assigned to different aspects of conversion quality measurements enable the object conversion index to reflect not only the overall conversion quality of the object, but also the priority of one or more aspects of conversion quality measurements associated with the object conversion index. It will also be appreciated that not every aspect of conversion quality measurements enable needs to be considered in computing the object conversion index. For example, the cost of correction measurement may be used as the object conversion index if the cost of correction aspect is dispositive for such user cases.

Figure 5:
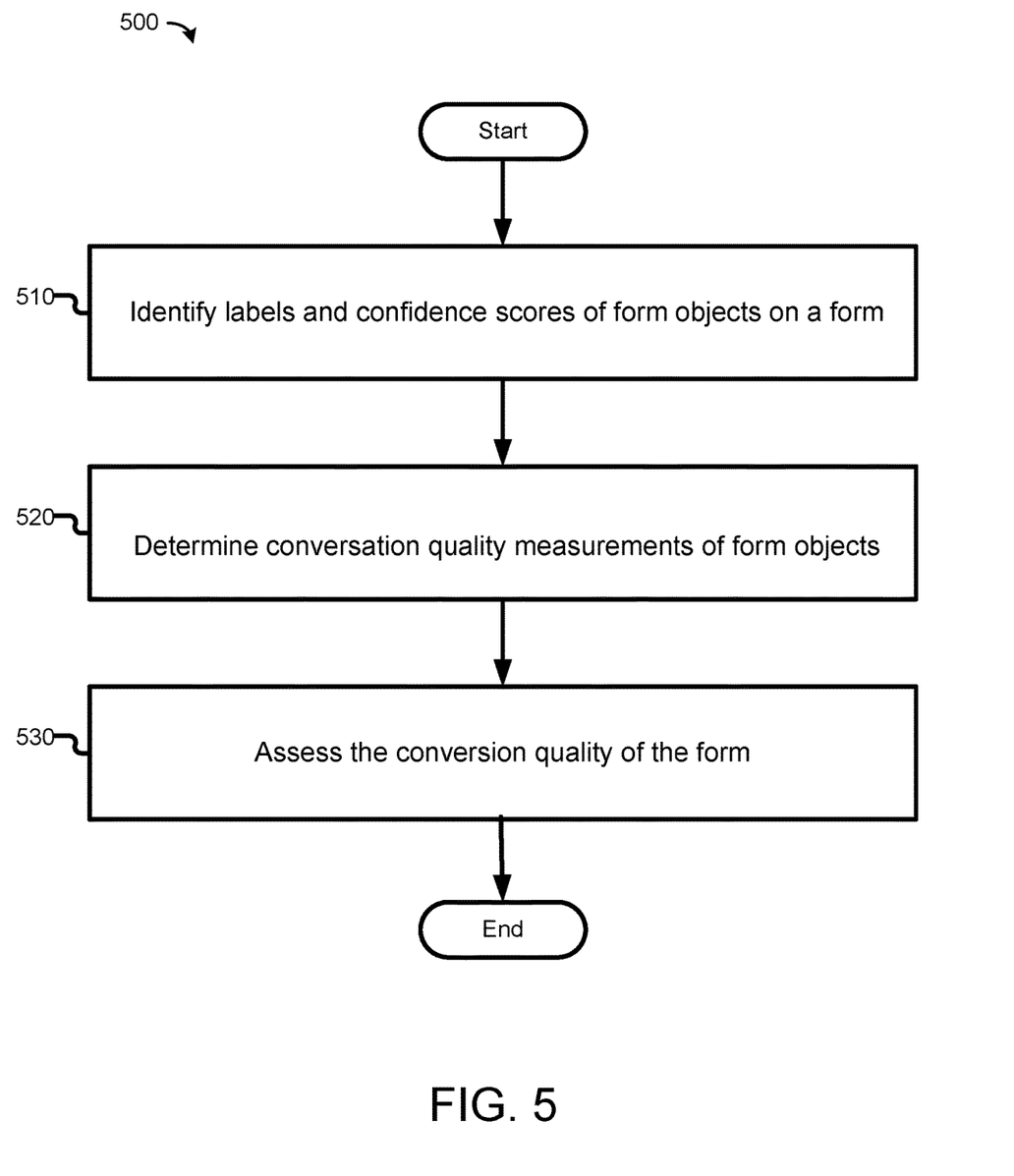
FIG. 5 is a flow diagram of an example process for assessing conversion quality of a form, incorporating aspects of the present disclosure, in accordance with one embodiment.

Referring now to FIG. 5, a flow diagram of an example process 500 for measuring conversion quality of a form, which can be practiced by an example conversion quality evaluation system in accordance with one embodiment, is provided. As shown, process 500 can be performed by a conversion quality evaluation system, e.g., system 100 of FIG. 1, to implement one or more embodiments of the present disclosure. Similar to process 400, in various embodiments, process 500 may have fewer or additional operations, or perform some of the operations in different orders.

At block 510, labels and confidence scores of form objects on a form may be identified, e.g., enabled by confidence engine 114 and classification engine 112 of FIG. 1, similar to the process associated with block 410.

At block 520, multiple conversion quality measurements of form objects may be determined e.g., by correction engine 122, reusability engine 124, accessibility engine 126, or device readiness engine 128 of FIG. 1, similar to the process associated with block 420. As discussed in connection with FIG. 3, an aspect of conversion quality of a form may be aggregated from respective measurements of the same aspect of conversion quality of each object in the form. In some embodiments, weights may be applied to different types of objects to represent different levels of importance. Accordingly, a conversion quality measurement of the form may additionally reflect the priority assigned to different types of objects in the form.

At block 530, the overall conversion quality of the form may be determined, such as the FCI generated by aggregation engine 132 of FIG. 1. In various embodiments, the overall conversion quality of a digitized form is based on multiple aspects of conversion quality measurements and respective weights associated with the multiple aspects of conversion quality measurements, as discussed in connection with FIG. 3. The weights may be manually assigned or adjusted by a user or automatically adjusted by aggregation engine 132.

The weights assigned to different aspects of conversion quality measurements may be adjusted, e.g., based on a characteristic of the digitized form. As an example, if the form is designed for mobile users, more weight may be assigned to the aspect of device readiness. As another example, if the form is designed for visually impaired individuals, more weight may be assigned to the aspect of user accessibility. As yet another example, if aggregation engine 132 detects a high level of cost of correction, aggregation engine 132 may dynamically increase the weight assigned to the aspect of cost of correction because that aspect is likely to be dominant for the overall conversion quality. In this regard, aggregation engine 132 may have a predetermined standard threshold (e.g., a medium value or a range of common values) for each aspect of conversion quality. If the observed measurement of a particular aspect of conversion quality deviates significantly from the standard threshold, aggregation engine 132 may dynamically adjust the weight assigned to that aspect.

Figure 6:
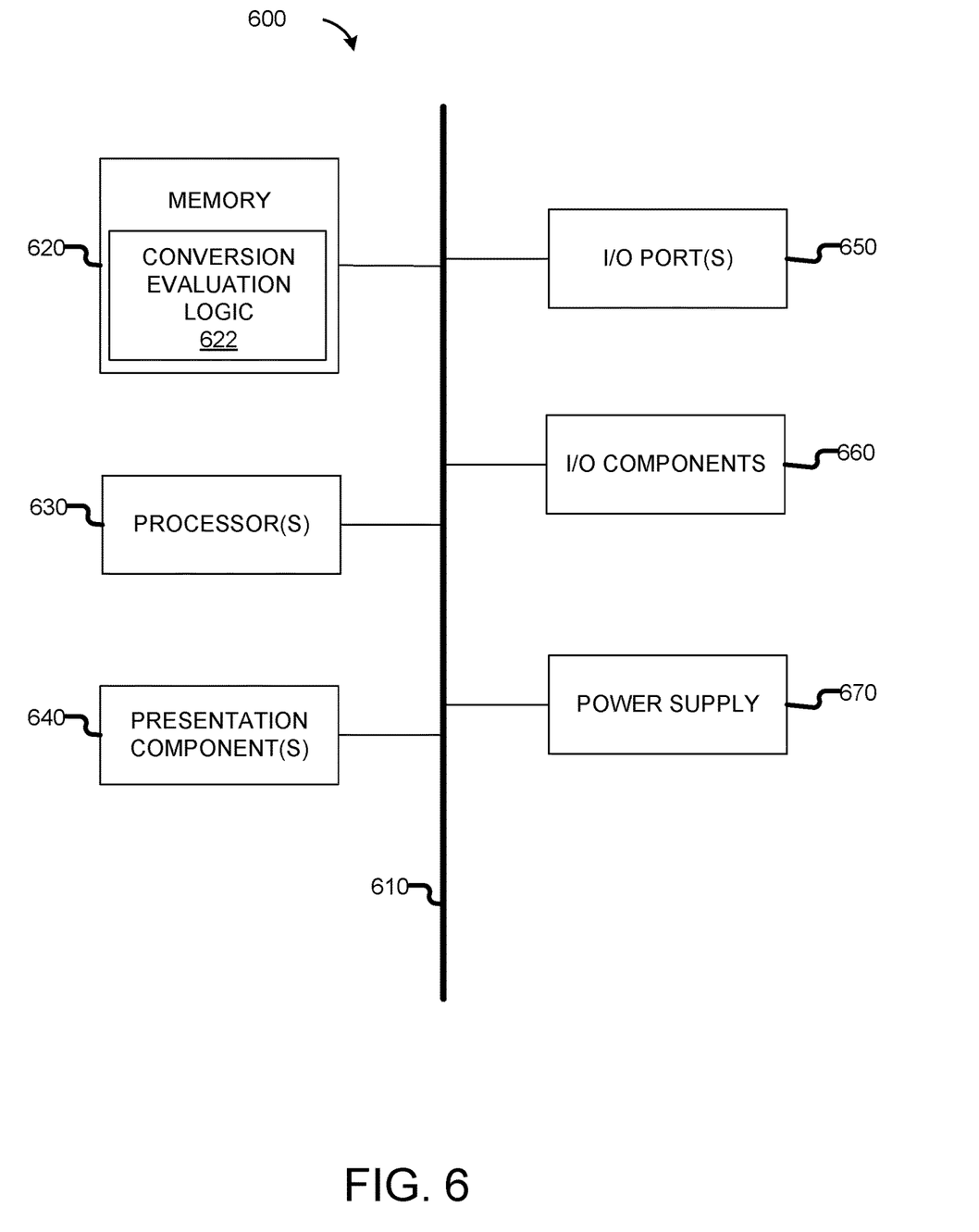
FIG. 6 illustrates an example computing device suitable for practicing the disclosed embodiments, in accordance with one embodiment.

Having briefly described an overview of embodiments of the present invention, an exemplary operating environment in which embodiments of the present invention is to be implemented is described below in order to provide a general context for various aspects of the present invention. Referring initially to FIG. 6 in particular, an exemplary operating environment for implementing embodiments of the present invention is shown and designated generally as computing device 600. Computing device 600 is but one example of a suitable computing environment and is not intended to suggest any limitation as to the scope of use or functionality of the invention. Neither should the computing device 600 be interpreted as having any dependency or requirement relating to any one or combination of components illustrated.

The disclosure is described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The embodiments of this disclosure are to be practiced in a variety of system configurations, including handheld devices, consumer electronics, general-purpose computers, more specialty computing devices, etc. The embodiments of this disclosure are to be practiced in distributed computing environments where tasks are performed by remote-processing devices that are linked through a communications network.

With reference to FIG. 6, computing device 600 includes a bus 610 that directly or indirectly couples the following devices: memory 620, one or more processors 630, one or more presentation components 640, input/output (I/O) ports 650, input/output (I/O) components 660, and an illustrative power supply 670. Bus 610 represents one or more busses (such as an address bus, data bus, or combination thereof). Although the various blocks of FIG. 6 are shown with lines for the sake of clarity, in reality, delineating various components is not so clear, and metaphorically, the lines would more accurately be fuzzy. For example, a presentation component such as a display device could also be considered as an I/O component. Also, processors have memory. The inventor recognizes that such is the nature of the art, and reiterates that the diagram of FIG. 6 is merely illustrative of an exemplary computing device that is used in connection with one or more embodiments of the present invention. Distinction is not made between such categories as "workstation," "server," "laptop," "handheld device," etc., as all are contemplated within the scope of FIG. 6 and reference to "computing device."

Computing device 600 typically includes a variety of computer-readable media. Computer-readable media include any available media to be accessed by computing device 600, and include both volatile and nonvolatile media, and removable and non-removable media. By way of example, and not limitation, computer-readable media comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which is used to store the desired information and which is accessed by computing device 600. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 620 includes computer storage media in the form of volatile and/or nonvolatile memory. In various embodiments, the memory is removable, non-removable, or a combination thereof. Exemplary hardware devices include solid-state memory, hard drives, optical-disc drives, etc. Computing device 600 includes one or more processors that read data from various entities such as memory 620 or I/O components 660. Presentation component(s) 640 present data indications to a user or other device. Exemplary presentation components include a display device, speaker, printing component, vibrating component, etc.

In various embodiments, memory 620 includes, in particular, temporal and persistent copies of conversion evaluation logic 622. Conversion evaluation logic 622 includes instructions that, when executed by one or more processors 630, result in computing device 600 to evaluate conversion quality of a form or a form object, such as, but not limited to, process 400, or process 500. In various embodiments, conversion evaluation logic 622 includes instructions that, when executed by processors 630, result in computing device 600 performing various functions associated with, but not limited to, classification engine 112, confidence engine 114, correction engine 122, reusability engine 124, accessibility engine 126, device readiness engine 128, or aggregation engine 132, in connection with FIG. 1.

In some embodiments, one or more processors 630 are to be packaged together with conversion evaluation logic 622. In some embodiments, one or more processors 630 are to be packaged together with conversion evaluation logic 622 to form a System in Package (SiP). In some embodiments, one or more processors 630 are integrated on the same die with conversion evaluation logic 622. In some embodiments, processors 630 are integrated on the same die with conversion evaluation logic 622 to form a System on Chip (SoC).

I/O ports 650 allow computing device 600 to be logically coupled to other devices including I/O components 660, some of which are built-in components. Illustrative components include a microphone, joystick, game pad, satellite dish, scanner, printer, wireless device, etc. In some embodiments, the I/O components 660 also provide a natural user interface (NUI) that processes air gestures, voice, or other physiological inputs generated by a user. In some embodiments, inputs are to be transmitted to an appropriate network element for further processing. An NUI implements any combination of speech recognition, stylus recognition, facial recognition, biometric recognition, gesture recognition both on screen and adjacent to the screen, air gestures, head and eye tracking, and touch recognition (as described in more detail below) associated with a display of the computing device 600. The computing device 600 is equipped with depth cameras, such as stereoscopic camera systems, infrared camera systems, RGB camera systems, touchscreen technology, and combinations of these, for gesture detection and recognition. Additionally, the computing device 600 is equipped with accelerometers or gyroscopes that enable detection of motion. The output of the accelerometers or gyroscopes is to be provided to the display of the computing device 600 to render immersive augmented reality or virtual reality.

Although certain embodiments have been illustrated and described herein for purposes of description, a wide variety of alternate and/or equivalent embodiments or implementations calculated to achieve the same purposes could be substituted for the embodiments shown and described without departing from the scope of the present disclosure. This application is intended to cover any adaptations or variations of the embodiments discussed herein. Therefore, it is manifestly intended that embodiments described herein be limited only by the claims.

What is claimed is:

1. A computer-implemented method, comprising:
    identifying, by a processor, a plurality of labels with respective confidence scores for a first form object of a digitized form, wherein each of the plurality of labels represents a class of form objects;
    determining, by the processor, a first measurement of conversion quality of the first form object based on the plurality of labels and respective confidence scores; and
    assessing, by the processor, conversion quality of the digitized form based on the first measurement of conversion quality of the first form object and at least a second measurement of conversion quality of a second form object on the digitized form.

2. The method of claim 1, further comprising:
    predicting the respective confidence scores for the plurality of labels, wherein a confidence score of the respective confidence scores represents a likelihood of association between the first form object and a respective label of the plurality of labels.

3. The method of claim 1, wherein determining the first measurement of conversion quality of the first form object comprises:
    retrieving conversion information of a number of operations used to convert a form object to another form object based on the labels;
    identifying a representative label of the first form object from the plurality of labels based on the respective confidence scores; and
    calculating a weighted average measurement for converting the representative label to each of other label in the plurality of labels.

4. The method of claim 3, wherein assessing conversion quality of the digitized form comprises:
    combining the first measurement of conversion quality of the first form object and the second measurement of conversion quality of the second form object based on a first predetermined weight associated with a final prediction label of the first form object and a second predetermined weight associated with a final prediction label of the second form object.

5. The method of claim 1, wherein the second form object is a same level construct as the first form object, and wherein assessing conversion quality of the digitized form comprises:
    averaging the first measurement of conversion quality of the first form object and the second measurement of conversion quality of the second form object.

6. The method of claim 1, wherein the second form object includes the first form object, and wherein a final confidence score of the second form object is based on a final confidence score of the first form object.

7. The method of claim 1, further comprising:
determining a second measurement of conversion quality of the first form object based on an object conversion index of a verified form object, wherein the second measurement of conversion quality comprises a product of the object conversion index and a confidence score associated with the first form object.

8. The method of claim 1, wherein assessing conversion quality of the digitized form further comprises assessing a device readiness score for the digitized form based on a paragraph count, a field count, or a section count in the digitized form.

9. One or more computer storage media comprising computer-implemented instructions that, when used by one or more computing devices, cause the one or more computing devices to:
select an object label with a highest confidence score among a plurality of object labels with respective confidence scores assigned to a form object in a digitized form;
identify a cost of correction for the form object based on a number of operations to convert the object label with the highest confidence score to at least one other object label in the plurality of object labels; and
measure conversion quality of the form object based on the cost of correction for the form object.

10. The one or more computer storage media of claim 9, the instructions further cause the one or more computing devices to:
assign the plurality of object labels with the respective confidence scores to the form object of the plurality of form objects.

11. The one or more computer storage media of claim 9, the instructions further cause the one or more computing devices to:
assign a weight to the cost of correction for the form object; and
measure the conversion quality of the form object based on the cost of correction for the form object and the weight.

12. The one or more computer storage media of claim 9, the instructions further cause the one or more computing devices to:
search a matching form object for the form object from a collection of verified form objects;
determine a content reusability score for the form object based on the highest confidence score and an object conversion index of the matching form object; and
measure the conversion quality of the form object based on the cost of correction for the form object and the content reusability score for the form object.

13. The one or more computer storage media of claim 12, the instructions further cause the one or more computing devices to:
determine an accessibility score for the form object based on a probability of the form object of being accessible and an accessibility threshold probability.

14. The one or more computer storage media of claim 13, the instructions further cause the one or more computing devices to:
determine a device readiness score for the digitized form based on a count of incomplete paragraphs in the digitized form.

15. The one or more computer storage media of claim 14, the instructions further cause the one or more computing devices to:
determine an object conversion index for the form object to represent the conversion quality of the form object, wherein the object conversion index is determined based on the cost of correction for the form object, the content reusability score for the form object, the accessibility score for the form object, and the device readiness score.

16. The one or more computer storage media of claim 9, the instructions further cause the one or more computing devices to:
attribute the highest confidence score of the form object to determine a cost of correction for another form object that contains the form object.

17. The one or more computer storage media of claim 16, the instructions further cause the one or more computing devices to:
determine a cost of correction for the digitized form based on the cost of correction for another form object and the cost of correction for the form object; and
measure conversion quality of the digitized form based on cost of correction for the digitized form.

18. A system, comprising:
means for assigning a plurality of labels with respective confidence scores to a form object of a digitized form, wherein each of the plurality of labels represents a class of form objects;
means for determining a plurality of conversion quality measurements for the form object based on the plurality of labels and respective confidence scores; and
means for assessing conversion quality of the digitized form based on the plurality of conversion quality measurements for the form object and respective predetermined weights associated with the plurality of conversion quality measurements.

19. The system of claim 18, further comprising:
means for adjusting the respective predetermined weights associated with the plurality of conversion quality measurements based on a characteristic of the digitized form.

20. The system of claim 18, wherein the plurality of conversion quality measurements comprises a measurement of cost of correction, a measurement of content reusability, a measure of device readiness, and a measurement of accessibility.

* * * * *